Figure 1:
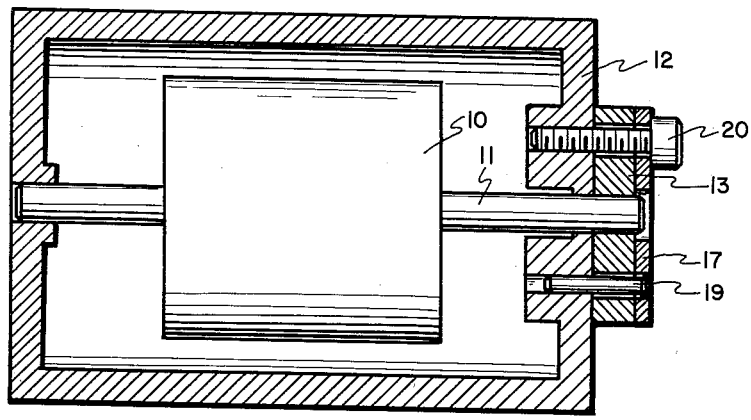

Aug. 29, 1961     C. E. BARKALOW     2,997,885

LOCKING CLAMP FOR INSTRUMENTS

Filed Nov. 18, 1958

*INVENTOR.*
CLARE E. BARKALOW

United States Patent Office 2,997,885
Patented Aug. 29, 1961

2,997,885
LOCKING CLAMP FOR INSTRUMENTS
Clare E. Barkalow, Comstock Park, Mich., assignor to Lear, Incorporated
Filed Nov. 18, 1958, Ser. No. 774,537
3 Claims. (Cl. 74—5)

This invention relates to locking clamp arrangements and more particularly to locking clamps for rate gyroscopes.

In the manufacture of rate gyroscopes which utilize torsion bars for support, the final positioning of the torsion bars to the frame as well as minor angular adjustments are highly critical and present a major problem to the manumacturer. The torsion bar and rotor attached to the torsion bar must be positioned precisely. Ususally an electrical pickoff detects movement of the rotor and in some cases an angular displacement of .001 of a degree causes a 3 millivolt output signal which is not tolerable for an initial setting. In other words, the rotor and bar must be positioned exactly so as not to produce an output from the pickoff or stator. In most cases, the rotor of the rate gyroscope is relatively small, e.g., in the three-quarter of an inch diameter class.

In the past, split collets have been used to fasten the torsion bar to the frame or housing. The problem here is that in tightening the collet to the frame, the screw head usually deflects the collet a little. Hence, the assembler must guess at the amount of deflection and preset the collet an equal amount in the opposite direction. This is a tedious and non-precise method of manufacturing rate gyroscopes.

Other methods have been to take a large bar stock and machine the bulk of it down to the required torsion bar size leaving a fastening plate at either or both ends of the torsion bar, the assumption being that the plate is fixed to the bar and has a pin or key therein for locking it into position when attached to the frame. This method, however, does not allow for minor adjustments and the properties of the middle portion of the bar stock are not considered the best for torsion bars.

Another method is to make external adjustments by moving the stator or pickoff; but here again in locking the stator there is a problem of the locking means moving the stator. In any case, the torsion bar must be clamped in a manner to be dimensionally stable. In order to produce a reliable and acceptable rate gyroscope, the manufacturer must make one that is initially set to null at the factory and holds that setting indefinitely. Thus, angular position stability to very close limits is essential.

It is an object, therefore, of this invention to provide a locking means for securing the torsion bar suspension of a rate gyroscope in a manner to insure long term and precise dimensional stability.

It is another object of this invention to provide a precise locking means for a rate gyroscope wherein the torsion bar can be securely locked to the frame after the bar has been initially set without causing significant movement of the bar.

A further object of this invention is to provide a locking means for a torsion bar suspension of a rate gyroscope wherein the angular position or setting of the torsion bar may be finely adjusted without disturbing its axial position.

Figure 2:
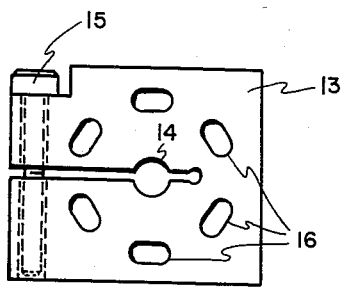
Figure 3:
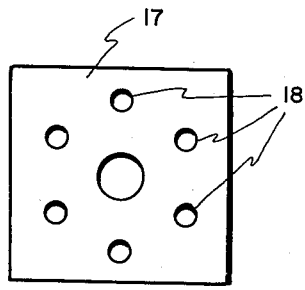

Other objects and advantages of this invention will become apparent from the following description when taken in conjunction with the drawing in which:

FIG. 1 is a cross-section of the present invention;
FIG. 2 is a plan view of the split collet; and
FIG. 3 is a plan view of the end plate.

Referring now to the drawings, a rate gyroscope 10 is supported by a torsion bar 11. A frame or housing 12 incloses the rate gyroscope 10. One end of the torsion bar 11 extends through the frame 12. The other end of torsion bar 11 is press fit or otherwise secured to frame 12. A split clamp or collet 13 has a hole 14 therein to accommodate the end of torsion bar 11. A screw 15 is positioned in the collet to tighten the collet around the end of the torsion bar 11. The collet 13 has a plurality of holes 16 therein. An end plate 17 is substantially the same size as the collet 13 and has a plurality of holes 18, the centers of holes 18 being coincident with the centers of the holes 16 in the collet 13 when the collet 13 and plate 17 are put in place on the shaft 11. A plurality of dowels 19, e.g., three, are press fit into holes in the frame 12 and extend out through the collet 13 and plate 17 and are secured to the plate 17 by means of soldering or the like. A plurality of clamping screws 20, e.g., three, extend through the plate 17, collet 13 and into threaded holes in the frame 12. It is to be noted that the holes 16 are elongated and relatively larger than the holes 18.

In locking the torsion bar, the dowels 19 are first placed in the frame 12. The collet 13 is then placed on the end of torsion bar 11 and the screw 15 is tightened to secure the collet 13 to the torsion bar 11. The torsion bar 11 is now generally aligned but requires further minor adjustment. The plate 17 is placed against the collet 13 such that the dowels 19 protrude into holes 18. The clamping screws 20 are tightened against the end plate 17 just enough to allow movement of the collet 13 under minimum pressure. The dowels are then secured to the plate 17 by soldering or other means. The torsion bar 11 is then positioned by slight rotation of the collet 13 so that the pickoff does not have an output signal representing displacement of the rotor. This can be readily and precisely accomplished by applying light impacts tangentially to the periphery of the collet, with screws 20 partially tight. The clamping screws 20 are then tightened securely causing the collet 13 to be held rigidly to the frame 12.

It can be seen that because the plate 17 is soldered to the dowels 19, the plate is held rigidly against the turning of the clamping screw heads. In other words, the plate resists angular movement and hence the collet remains stationary making it relatively easy to set the rate gyroscope to null and lock it there. The dowels 19, being press fit into the frame 12, allow longitudinal movement of the plate 17 so that the collet 13 can be sandwiched between the plate 17 and frame 12.

Although the present invention has been described with a certain degree of particularity, it is understood that various modifications in the details and arrangements of parts may be had without departing from the spirit and scope of the invention as hereinafter claimed.

I claim:
1. Positioning means for spring centered instruments comprising: a housing inclosing said spring centered instrument, a torsion bar connected to support said instrument, means supporting one end of said torsion bar, clamping means including a clamp capable of being secured to said torsion bar and plate means secured to said housing, said clamp having recesses therein and positioned between said housing and said plate means such that portions of said plate means extend through the recesses in said clamp and join with said housing.

2. The device as claimed in claim 1 wherein said plate means comprises: a plate having a plurality of holes therein, a plurality of dowels positioned and soldered in some of said plate holes such that the dowels extend through said clamp and are press fit into matching holes in said housing, and securing means passing through some of said holes in said plate to said housing for tightening said plate to said housing such that said clamp may be adjusted and secured.

3. Positioning and locking apparatus for a rate gyroscope utilizing a torsion bar suspension comprising: a torsion bar, means supporting one end of said torsion bar, a plate having a plurality of holes therein, a split collet clamp having a plurality of oversized holes in alignment with said holes in said plate to allow the passage of securing means, said collet capable of being secured to the other end of said torsion bar, a frame having a plurality of holes matching said holes in said collet and said plate, some of which will accommodate said securing means, said collet being positioned between said frame and said plate, dowels capable of being press fit into holes in said frame and loosely fit through said collet and securable to said plate by solder, and screw means passing through said plate and collet and into said frame to tighten said plate and collet to said frame.

References Cited in the file of this patent

UNITED STATES PATENTS

| | | |
|---|---|---|
| 2,511,178 | Roters | June 13, 1950 |
| 2,672,054 | Warren et al. | Mar. 16, 1954 |
| 2,816,448 | Dixson | Dec. 17, 1957 |